United States Patent
Usami

(10) Patent No.: US 10,084,373 B2
(45) Date of Patent: Sep. 25, 2018

(54) POWER CONVERSION DEVICE

(71) Applicant: TOSHIBA TEC KABUSHIKI KAISHA, Tokyo (JP)

(72) Inventor: Yutaka Usami, Izunokuni Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/202,599

(22) Filed: Jul. 6, 2016

(65) Prior Publication Data
US 2017/0033706 A1 Feb. 2, 2017

(30) Foreign Application Priority Data

Jul. 31, 2015 (JP) ................. 2015-151846

(51) Int. Cl.
H02M 7/04 (2006.01)
H02M 5/42 (2006.01)
H02M 1/42 (2007.01)
H02M 1/00 (2006.01)

(52) U.S. Cl.
CPC .. *H02M 1/4225* (2013.01); *H02M 2001/0009* (2013.01); *Y02B 70/126* (2013.01)

(58) Field of Classification Search
CPC .... H02M 1/081; H02M 1/126; H02M 1/4233; H02M 7/1623
USPC .... 323/241, 246, 273, 275, 300; 363/16, 17, 363/21.01, 21.02, 39, 44, 45, 47, 48, 65, 363/67, 68, 78, 79, 84–86, 88, 89, 97, 98
See application file for complete search history.

(56) References Cited

U.S. PATENT DOCUMENTS

| 5,063,490 A * | 11/1991 | Maehara | H05B 41/28 315/105 |
| 5,463,299 A * | 10/1995 | Futami | H02P 6/06 318/400.13 |
| 5,801,517 A * | 9/1998 | Borle | H02M 7/53871 323/207 |
| 7,126,832 B2 * | 10/2006 | Sasaki | H02M 1/4233 363/44 |

(Continued)

FOREIGN PATENT DOCUMENTS

| JP | 2010-119159 | 5/2010 |
| JP | 2015-080316 | 4/2015 |

*Primary Examiner* — Gary Nash
(74) *Attorney, Agent, or Firm* — Patterson & Sheridan, LLP

(57) ABSTRACT

According to one embodiment, a power conversion device includes a first switch serially connected to a second switch, a first diode serially connected to a second diode, the first switch and the first diode connected to the second switch and the second diode, an AC power supply and an inductor serially connected to a connection point between the first switch and the second switch and a connection point between the first diode and the second diode, a capacitor serially connected to ends of the first diode and the second diode connected, and a potential difference between the ends of the capacitor is used as an output voltage. The control unit supplies a pulse signal to the first switch and the second switch to provide a sinusoidal current through the AC power supply, based on a detected power supply voltage, a detected circuit current, and a detected capacitor voltage.

20 Claims, 11 Drawing Sheets

(56) References Cited

U.S. PATENT DOCUMENTS

| | | | | |
|---|---|---|---|---|
| 2006/0007716 A1* | 1/2006 | Takahashi | | H02M 7/219 |
| | | | | 363/89 |
| 2012/0092909 A1* | 4/2012 | Usami | | H02M 7/217 |
| | | | | 363/80 |
| 2012/0092911 A1* | 4/2012 | Usami | | H02M 7/217 |
| | | | | 363/89 |
| 2012/0099356 A1* | 4/2012 | Usami | | H02M 7/219 |
| | | | | 363/126 |
| 2012/0293141 A1* | 11/2012 | Zhang | | H02M 1/4233 |
| | | | | 323/207 |
| 2013/0070500 A1* | 3/2013 | Usami | | H02M 7/12 |
| | | | | 363/126 |
| 2013/0265804 A1* | 10/2013 | Fu | | H02M 3/33576 |
| | | | | 363/17 |
| 2014/0071724 A1* | 3/2014 | Chiba | | H02M 7/2173 |
| | | | | 363/89 |
| 2014/0098583 A1* | 4/2014 | Nishibori | | H02M 1/4225 |
| | | | | 363/89 |

\* cited by examiner

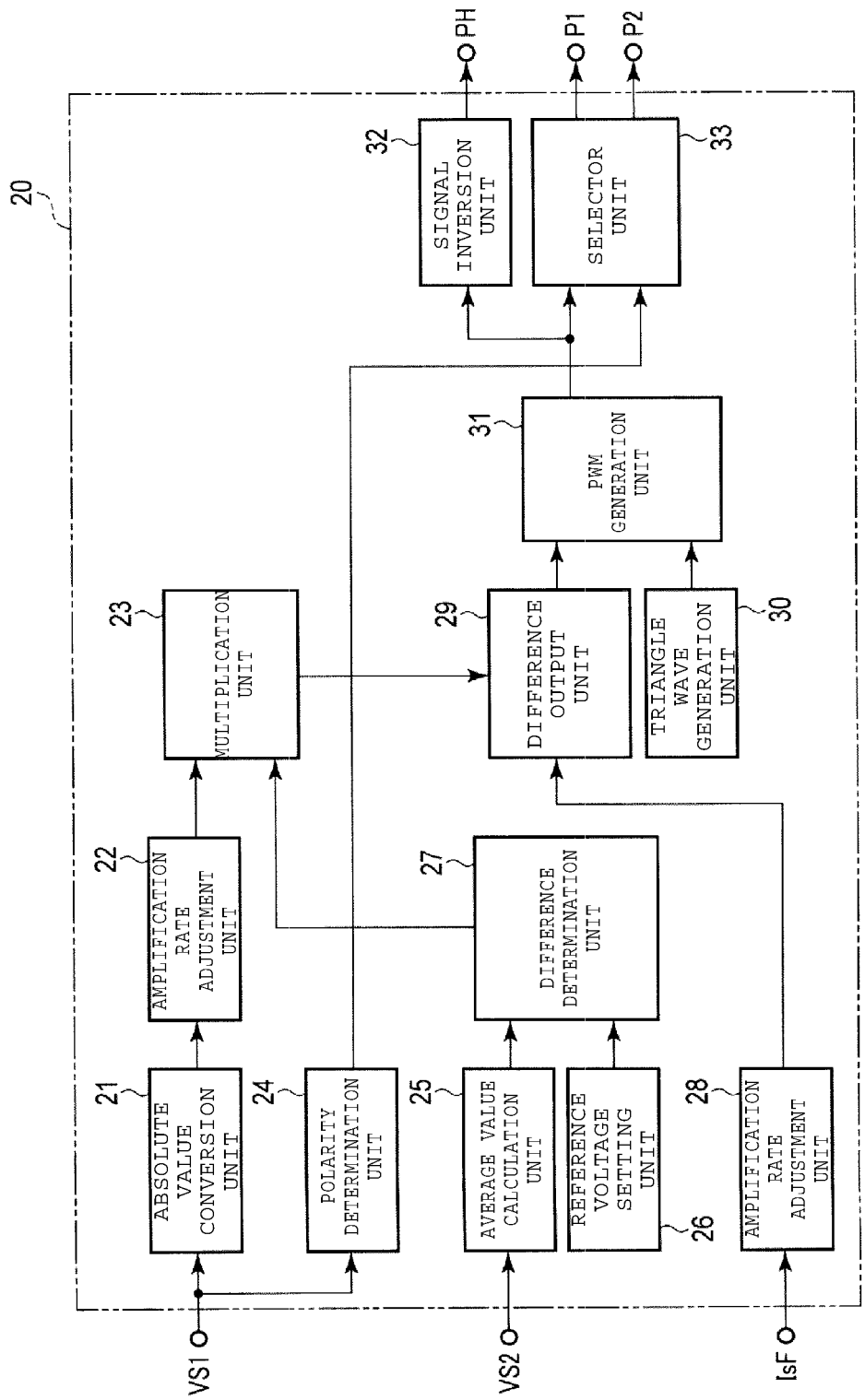

US 10,084,373 B2

POWER CONVERSION DEVICE

CROSS-REFERENCE TO RELATED APPLICATION

This application is based upon and claims the benefit of priority from Japanese Patent Application No. 2015-151846, filed on Jul. 31, 2015, the entire contents of which are incorporated herein by reference.

FIELD

Embodiments described herein relate generally to a power conversion device.

BACKGROUND

A power conversion device supplies power to a load by converting an AC voltage from an AC power supply into a DC voltage different from the AC voltage. When a circuit which converts the AC voltage of the AC power supply into the DC voltage makes the AC current flowing through the AC power supply have a sinusoidal waveform having the same phase as that of an AC power supply voltage, the best power factor is obtained and harmonic noise is also reduced. A circuit having an input current of a sinusoidal wave is called a power factor correction (PFC) circuit module.

The power conversion device detects a circuit current which flows from an AC power supply to a circuit to generate a control signal. There are various known methods for detecting the circuit current using a power conversion device.

(1) An inexpensive method is to insert a resistor with low resistance into a current path and detect a voltage which is generated on both ends thereof. However, this method requires a full-wave rectification circuit at a front stage. Accordingly, cost is reduced, but there is a problem that overall efficiency decreases due to the fact that full-wave rectification is needed.

(2) Another method is to use an insulation current transformer. In this case, there is a problem that cost increases due to the current transformer, but there is an advantage that high efficiency is achieved since the full-wave rectification is not required. These methods, however, cannot provide both high efficiency and inexpensive control.

DESCRIPTION OF THE DRAWINGS

FIG. 2 is a block diagram illustrating an example of a control unit of the power conversion device according to the first embodiment.

DETAILED DESCRIPTION

In general, according to one embodiment, a power conversion device includes a power conversion circuit and a control unit. In the power conversion circuit, a first switch is connected in series to a second switch, a first diode is connected in series to a second diode to form a serial connection, a closed loop is formed by connecting the first switch to the first diode and the second switch to the second diode respectively, a series-connection of an AC power supply and a first inductor is connected to a connection point between the first switch and the second switch and a connection point between the first diode and the second diode, a capacitor is connected to both ends of the serial connection of the first diode and the second diode, and a potential difference between two ends of the capacitor is used as an output voltage. The control unit supplies a first burst pulse signal and a second burst pulse signal, wherein the first burst pulse signal turns on and off the first switch, and a burst time width of the first burst pulse signal is generated according to positive polarity of the AC power supply, and wherein the second burst pulse signal turns on and off the second switch, and a second burst time width of the second burst pulse signal is generated according to negative polarity of the AC power supply, so that a sinusoidal wave current synchronous with a voltage phase of the AC power supply flows through the AC power supply, based on a detected value of a power supply voltage that is obtained by a unit detecting a voltage of the AC power supply, a detected value of a circuit current that is obtained by a unit detecting a current which carries electric charges to the capacitor of the power conversion circuit, and a detected value of a capacitor voltage that is obtained by a unit detecting a smoothing voltage of the capacitor.

(First Embodiment)

Hereinafter, embodiments will be described with reference to the accompanying drawings.

Figure 1:
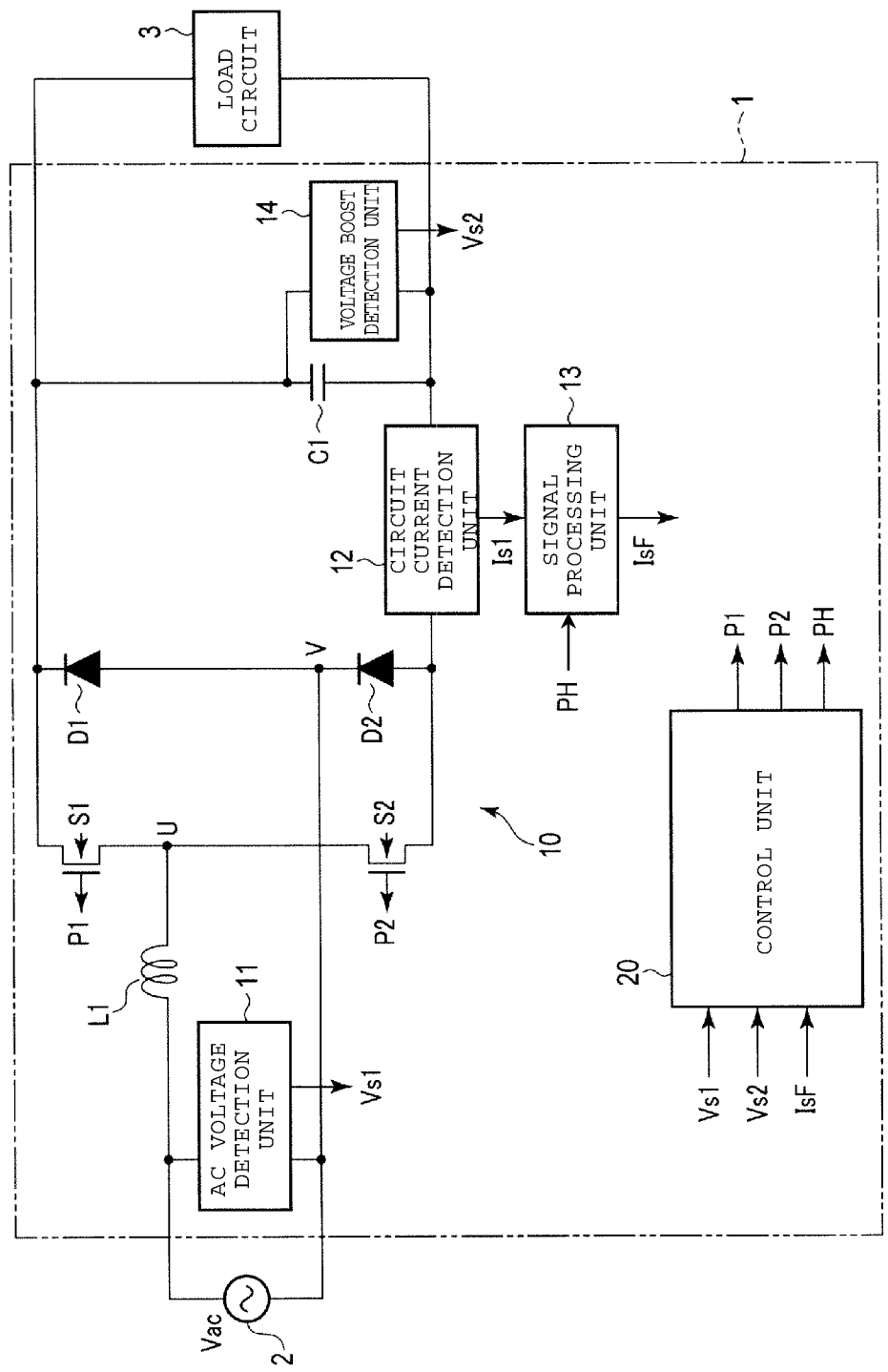
FIG. 1 is a diagram illustrating an example of a power conversion device according to a first embodiment.

FIG. 1 is a diagram illustrating an example of a power conversion device 1 according to a first embodiment.

The power conversion device 1 converts an AC voltage from an AC power supply 2 into a DC voltage different from the AC voltage. For example, a load circuit 3 which is connected to the power conversion device 1 is connected to a load which may operate on the basis of a DC voltage. For example, the load circuit 3 may be a heater which includes resistor components, and may include an inverter which converts DC into high-frequency AC. In the example illustrated in FIG. 1, the power conversion device 1 converts an AC voltage of the AC power supply 2, serving as an input power supply, into a DC voltage, and outputs the DC voltage.

As illustrated in FIG. 1, the power conversion device 1 includes a power conversion circuit 10 and a control unit 20. The power conversion circuit 10 includes switches S1 and S2, diodes D1 and D2, a capacitor C1, an inductor L1, an AC voltage detection unit 11, a circuit current detection unit 12, a signal processing unit 13, and a voltage detection unit 14.

In the power conversion circuit 10, the switch S1 (first switch) and the switch S2 (second switch) are connected in series to each other. The diode D1 (first diode) and the diode D2 (second diode) are connected in series to each other. The serial-connection of the switches S1 and S2 and the serial-connection of the diodes D1 and D2 are connected in parallel with each other and form a closed loop. The switches S1 and S2 can be semiconductor switches. For example, each of the switches S1 and S2 can also be a switch module which includes a MOSFET, a GaN transistor, a SiC transistor, or a compound transistor. In one embodiment, each of the switches S1 and S2 includes an N-type MOSFET. The N-type MOSFET of the switches S1 and S2 operates in a direction from a drain to a source as a switch. That is, the switches S1 and S2 are turned on when a signal (gate drive signal), which is applied to a gate, has a high (H) level, and are turned off when the signal, which is applied to the gate, has a low (L) level. In addition, the switches S1 and S2 are in an ON state in a direction from the source to the drain all the time due to a body diode, regardless of the gate drive signal.

The drain of the switch S1 is connected to a cathode of the diode D1. The source of the switch S1 is connected to the drain of the switch S2. In addition, an anode of the diode D1 is connected to a cathode of the diode D2. In addition, the source of the switch S2 is connected to an anode of the diode D2. The switches S1 and S2 and the diodes D1 and D2 form a closed loop, and form a bridge circuit.

Here, as illustrated in FIG. 1, a connection point between the source of the switch S1 and the drain of the switch S2 is referred to as a U point and a connection point between the anode of the diode D1 and the cathode of the diode D2 is referred to as a V point. The AC power supply 2 and the inductor L1 are connected in series between the U point and the V point. The connections between the respective units are not limited to a specific sequence.

The capacitor C1 is connected in parallel with the serial-connection of the switches S1 and S2 and the serial-connection of the diodes D1 and D2. A capacitor voltage of the capacitor C1 is applied to the load circuit 3 as an output voltage of the power conversion circuit 10.

The AC voltage detection unit 11 detects an application voltage of the AC power supply 2 and an output signal thereof is referred to herein as Vs1. The AC voltage detection unit 11 outputs to the control unit 20 the detected value Vs1 (power supply voltage value of an AC power supply Vac) indicating an instantaneous value of a power supply voltage from the AC power supply 2. For example, the AC voltage detection unit 11 is connected in parallel with both ends of the AC power supply 2.

The circuit current detection unit 12 detects a circuit current which flows through the capacitor C1. The circuit current detection unit 12 outputs a detected value Is1 indicating an instantaneous value of the circuit current to the signal processing unit 13. The circuit current detection unit 12 functions as a current detection unit. The circuit current detection unit 12 is connected in series between the anode of the diode D2 and the capacitor C1, and detects a current flowing through a path between the capacitor C1 and the diode D2 and another current flowing through a path between the capacitor C1 and the body diode of S2. Alternately, the circuit current detection unit 12 may be connected between the cathode of the diode D1 and the capacitor C1.

The signal processing unit 13 corrects the detected value Is1, based on a gate drive signal PH which is output from the control unit 20. The signal processing unit 13 outputs to the control unit 20 the detected value Is1, which is corrected based on the gate drive signal PH, as a correction value IsF. The signal processing unit 13 and the gate drive signal PH will be described below.

The voltage detection unit 14 detects a voltage of the capacitor C1. The voltage detection unit 14 outputs to the control unit 20 a detected value Vs2 indicating an instantaneous value of the capacitor voltage. The voltage detection unit 14 is connected in parallel with both ends of the capacitor C1.

The load circuit 3 is connected to the both ends of the capacitor C1. The load circuit 3 may be a resistance load, and may be a combination, or the like, of a circuit which performs voltage conversion and a load.

The control unit 20 receives the detected value Vs1 of the AC voltage detection unit 11, the correction value IsF of the signal processing unit 13, and the detected value Vs2 of the voltage detection unit 14. The control unit 20 outputs gate drive signals P1, P2, and PH to the switch S1, the switch S2, and the signal processing unit 13, respectively. The gate drive signals P1 and P2 respectively switch on or off the switch S1 and the switch S2. In addition, the gate drive signal PH switches on or off a switch in the signal processing unit 13. Here, it is assumed that the gate drive signals P1, P2, and PH are pulse signals which switch on each switch when at an H level, and switch off each switch when at an L level. The control unit 20 controls the switch S1 and the switch S2, and at the same time, also controls the signal processing unit 13.

Next, an exemplary configuration of the control unit 20 in the power conversion device 1 will be described.

FIG. 2 is a block diagram illustrating an example of a functional configuration of the control unit 20 in the power conversion device 1 according to the first embodiment.

The control unit 20 includes an absolute value conversion unit 21, a first amplification rate adjustment unit 22, a multiplication unit 23, a polarity determination unit 24, an average value calculation unit 25, a reference voltage setting unit 26, a difference determination unit 27, a second amplification rate adjustment unit 28, a difference output unit 29, a triangle wave generation unit 30, a PWM (pulse-width modulation) generation unit 31, a signal inversion unit 32, and a selector unit 33. The respective units may be provided by hardware, or software. For example, a part or all of the respective units may be achieved by a DSP (digital signal processor).

The absolute value conversion unit 21 outputs an absolute value of an input signal. The absolute value conversion unit 21 receives the detected value Vs1 of the AC voltage detection unit 11, and converts the detected value Vs1 which is received into an absolute value. For example, when the detected value Vs1 is −1.41, the absolute value conversion unit 21 outputs +1.41. The absolute value conversion unit 21 supplies the absolute value of the detected value Vs1 to the first amplification rate adjustment unit 22.

The first amplification rate adjustment unit 22 supplies the multiplication unit 23 with a value which is obtained by adjusting the absolute value of the detected value Vs1, output by the absolute value conversion unit 21, by a predetermined amplification rate. For example, when the amplification rate is 0.64, an output becomes 0.9 when an input value is 1.41 (1.41×0.64=0.9).

The polarity determination unit 24 outputs a detected polarity of an input signal. The polarity determination unit 24 receives the detected value Vs1 and outputs a voltage representing the polarity of the detected value Vs1. The polarity determination unit 24 determines whether a value (the detected value Vs1) of an AC voltage from the AC power supply 2 is positive or negative. The polarity determination unit 24 supplies a signal indicating determination results of the polarity to the selector unit 33. For example, when a value of the power supply voltage is positive, the polarity determination unit 24 outputs "1" to the selector unit 33, and when the value of the power supply voltage is negative, the polarity determination unit 24 outputs "0" to the selector unit 33. That is, when a frequency of the AC voltage of the AC power supply 2 is 50 Hz, the polarity determination unit 24 alternately outputs "1" and "0" that is synchronized at 50 Hz.

The average value calculation unit 25 receives the detected value Vs2 (detected value of the voltage of the capacitor C1) of the voltage detection unit 14. When an initial frequency of the AC power supply 2 is 50 Hz, the voltage of the capacitor C1 includes a ripple voltage of 100 Hz components, which is double the initial frequency. The average value calculation unit 25 calculates an average value of voltages corresponding to one cycle of the frequency of the power supply 2. The average value calculation unit 25 supplies the calculated average value to the difference determination unit 27.

The reference voltage setting unit 26 sets a reference voltage. For example, the reference voltage has a numerical constant for determining a voltage target value of the capacitor C1.

The difference determination unit 27 outputs a difference value between an average value, which is calculated by the average value calculation unit 25, and a value of the reference voltage, which is set by the reference voltage setting unit 26. For example, voltages at both ends of the capacitor C1 varies at 410 V±50 V, and the detected value Vs2 of the voltage detection unit 14 is 4.1±0.5. In this case, the average value calculation unit 25 outputs 4.1 as an average value of the detected values Vs2. When an output value of the average value calculation unit 25 is 4.1, and the value which is set by the reference voltage setting unit 26 is 4.0, the difference determination unit 27 outputs 0.1 as the difference value. The difference determination unit 27 supplies the difference value to the multiplication unit 23.

The multiplication unit 23 generates a target value of a circuit current which is similar to an AC voltage Vac. For example, the multiplication unit 23 increases or decreases the current target value according to the difference value of the difference determination unit 27. When the detected value Vs2 of the voltage detection unit 14 is low, the multiplication unit 23 increases the amount of multiplication, thereby performing feedback loop control in which the current target value is set to be high. Accordingly, the detected value Vs2 of the voltage detection unit 14 is maintained constant.

For example, the multiplication unit 23 outputs a value which is obtained by multiplying an output value of the amplification rate adjustment unit 22 by a difference value from the difference determination unit 27. For example, when one input is 0.95 and the other input is 0.1, the multiplication unit 23 outputs 0.95×0.1=0.095 as multiplication results. The multiplication unit 23 supplies the multiplication results to the difference output unit 29.

The second amplification rate adjustment unit 28 adjusts the correction value IsF, which is output from the signal processing unit 13, at a predetermined amplification rate. For example, when an absolute value of the correction value IsF is 1.2 and the predetermined amplification rate is 0.5, the second amplification rate adjustment unit 28 outputs 0.6 as the adjusted value. The second amplification rate adjustment unit 28 supplies the adjusted value which is adjusted at the predetermined amplification rate to the difference output unit 29.

The difference output unit 29 outputs a difference between an input value from the multiplication unit 23 and the adjusted value from the second amplification rate adjustment unit 28. For example, when the input value from the multiplication unit 23 is 0.095 and the input from the second amplification rate adjustment unit 28 is 0.6, the difference output unit 29 outputs 0.095−0.6=−0.505. The difference output unit 29 supplies the difference value to the PWM generation unit 31.

The triangle wave generation unit 30 generates a triangle wave which is a carrier signal of PWM control. The triangle wave generation unit 30 generates a triangle wave having a predetermined frequency with a value in a range from 1 to −1. A frequency of the triangle wave which is generated by the triangle wave generation unit 30 is, for example, 20 kHz or the like. The triangle wave generation unit 30 outputs the generated triangle wave value to the PWM generation unit 31.

The PWM generation unit 31 generates a PWM signal using an output value of the difference output unit 29 and the triangle wave value output from the triangle wave generation unit 30. That is, the PWM generation unit 31 uses the output value of the difference output unit 29 as a PWM threshold. When a value of the triangle wave is greater than the output value of the difference output unit 29, the PWM generation unit 31 outputs the PWM signal in a H level. In addition, when the value of the triangle wave is equal to or less than the output value of the difference output unit 29, the PWM generation unit 31 outputs the PWM signal in a L level. For example, when the output value of the difference output unit 29 is −0.505, the PWM generation unit 31 outputs "1" when the PWM generation unit 31 determines that the triangle wave value is greater than −0.505, and outputs "0" when the PWM generation unit 31 determines that the triangle wave value is less than −0.505. The PWM generation unit 31 supplies the output signal to the selector unit 33.

When the correction value IsF is equal to or less than the current target value, the PWM generation unit 31 widens an ON pulse width of the PWM signal so as to be equal to the current target value. When the correction value IsF is equal to or greater than the current target value, the PWM generation unit 31 narrows the ON pulse width of the PWM signal so as to be equal to the current target value.

The signal inversion unit 32 receives the PWM signal which is generated by the PWM generation unit 31, and inverts the PWM signal. The signal inversion unit 32 outputs the inverted PWM signal to the signal processing unit 13 as the gate drive signal PH.

The selector unit 33 selects an output destination of the PWM signal according to the output value of the polarity determination unit 24. For example, when the output value of the polarity determination unit 24 is "1", the selector unit 33 outputs an output of the PWM generation unit 31 as P2. In addition, when the output value of the polarity determination unit 24 is "0", the selector unit 33 outputs the output of the PWM generation unit 31 as P1.

Next, a current flowing through the power conversion device 1 will be described.

First, a case where the AC voltage Vac of the AC power supply 2 is positive (that is, a case where the AC power supply 2 generates a voltage such that a current flows from the anode side of the diode D2 to the cathode side of the diode D2) will be described.

Figure 3A:
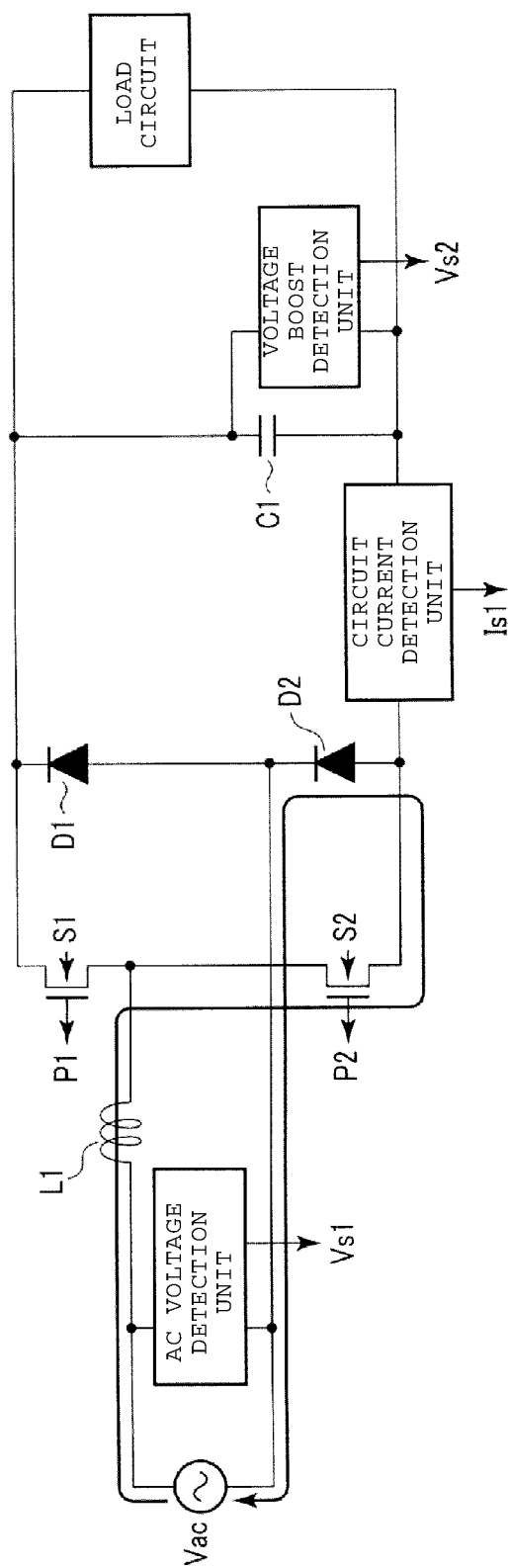
FIG. 3A is a diagram illustrating a current path, through which a current flows, of the power conversion device according to the first embodiment, when an AC power supply voltage is positive.
Figure 3B:
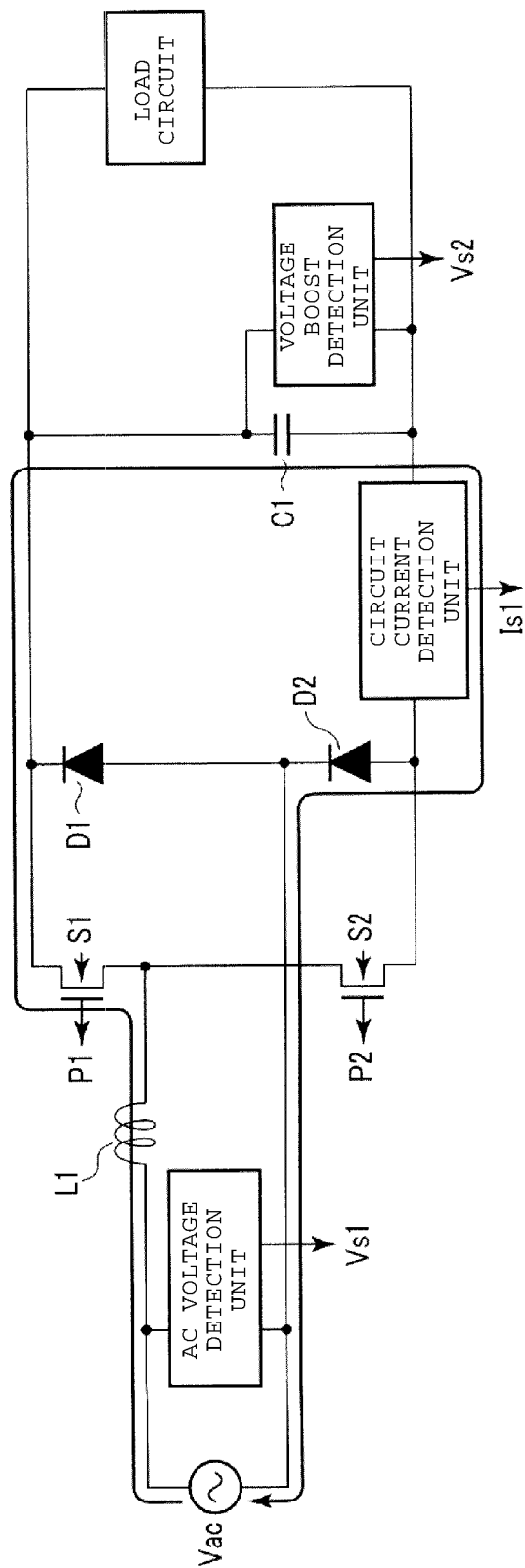
FIG. 3B is a diagram illustrating another example of the current path, through which the current flows, of the power conversion device according to the first embodiment.

FIGS. 3A and 3B are diagrams illustrating a current flowing through the power conversion circuit 10 when the AC voltage Vac of the AC power supply 2 is positive.

In this state, the control unit 20 controls a circuit current by switching the switch S2 on or off. In addition, the control unit 20 sends an "off" signal to the switch S1.

FIG. 3A illustrates an example of a state in which the switch S2 is turned on by the control unit 20. That is, the control unit 20 controls P2 so as to be at an H level.

In the state illustrated in FIG. 3A, a closed loop is formed by a path consisting of the AC power supply 2, the inductor L1, the switch S2, the diode D2, and the AC power supply 2. A circuit current flows in the sequence of the AC power supply 2, the inductor L1, the switch S2, the diode D2, and the AC power supply 2 by the AC voltage Vac of the AC power supply 2.

FIG. 3B illustrates an example of a state in which the switch S2 is turned off by the control unit 20. That is, the control unit 20 controls P2 so as to be in an L level.

The switch S1 is continuously receiving an "off" signal while the switch S2 repeats switching between On and Off, but admits current flowing in a direction from a source thereof to a drain thereof. Hence, in the state illustrated in FIG. 3B, a closed loop is formed by a path consisting of the AC power supply 2, the inductor L1, the switch S1, the capacitor C1, the circuit current detection unit 12, the diode D2, and the AC power supply 2. A circuit current flows in the sequence of the AC power supply 2, the inductor L1, the switch S1, the capacitor C1, the circuit current detection unit 12, the diode D2, and the AC power supply 2 by reactance energy accumulated in the inductor L1 in the state shown in FIG. 3A.

The control unit 20 controls a capacitance voltage, which is generated in the capacitor C1, by alternating the state of FIGS. 3A and 3B, while the AC voltage Vac is positive.

Subsequently, a case where the AC voltage Vac of the AC power supply 2 is negative will be described.

Figure 4A:
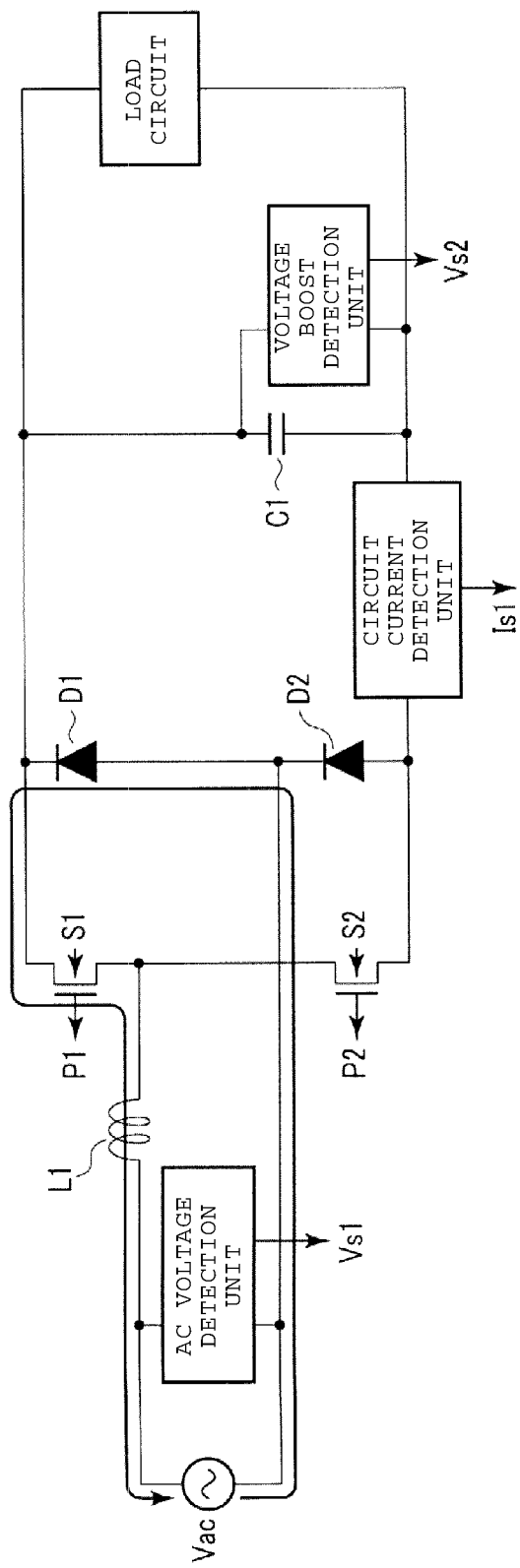
FIG. 4A is a diagram illustrating a current path, through which the current flows, of the power conversion device according to the first embodiment, when an AC power supply voltage is negative.
Figure 4B:
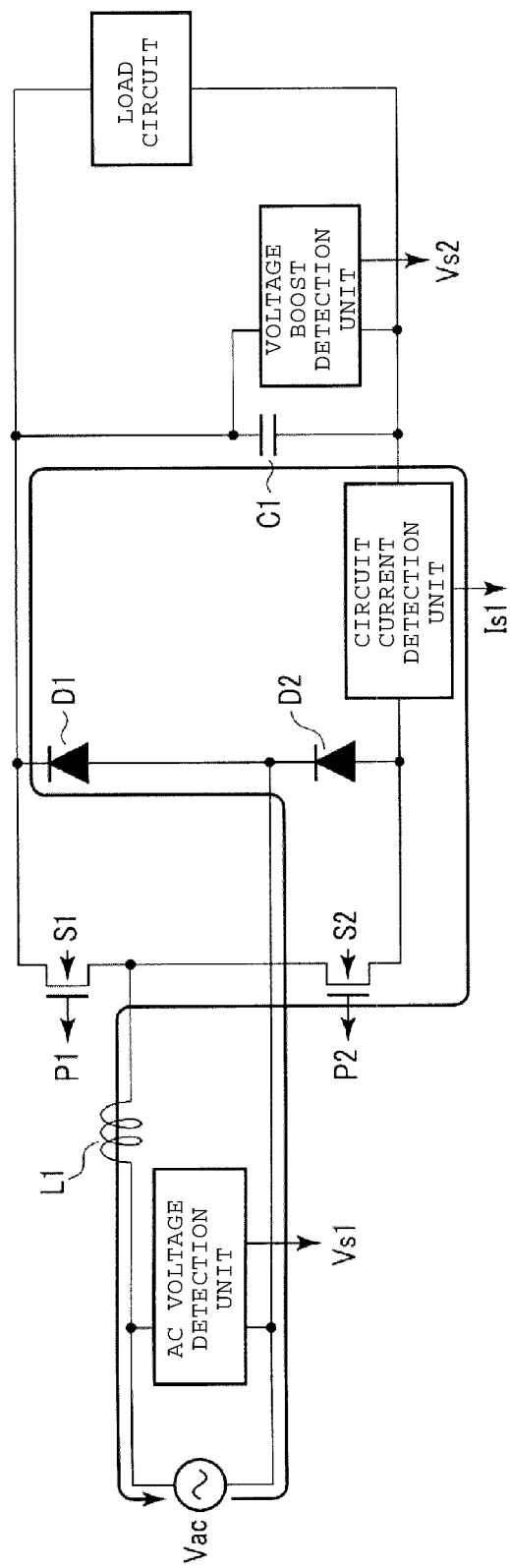
FIG. 4B is a diagram illustrating another example of the current path, through which the current flows, of the power conversion device according to the first embodiment.

FIGS. 4A and 4B are diagrams illustrating a current flowing through the power conversion device 1 when the AC voltage Vac of the AC power supply 2 is negative.

The control unit 20 controls a circuit current by switching on or off the switch S1. In addition, the control unit 20 sends an "off" signal to the switch S2.

FIG. 4A illustrates an example of a state in which the switch S1 is turned on by the control unit 20. That is, the control unit 20 controls P1 so as to be in an H level.

In the state illustrated in FIG. 4A, a closed loop is formed by a path consisting of the AC power supply 2, the diode D1, the switch S1, the inductor L1, and the AC power supply 2. A circuit current flows in the sequence of the diode D1, the switch S1, the inductor L1, and the AC power supply 2 by the AC voltage Vac of the AC power supply 2.

FIG. 4B illustrates an example of a state in which the switch S1 is turned off by the control unit 20. That is, the control unit 20 controls P1 so as to be in an L level.

The switch S2 is receiving an "off" signal in this state, but admits current in a direction from a source thereof to a drain thereof. Hence, in the state illustrated in FIG. 4B, a closed loop is formed by a path consisting of the AC power supply 2, the diode D1, the capacitor C1, the circuit current detection unit 12, the switch S2, the inductor L1, and the AC power supply 2. A circuit current flows in the sequence of the diode D1, the capacitor C1, the circuit current detection unit 12, the switch S2, the inductor L1, and the AC power supply 2 by reactance energy accumulated in the inductor L1 in the state of FIG. 4A.

The control unit 20 controls a capacitance voltage which is generated in the capacitor C1 by alternating the state of FIGS. 4A and 4B, while the AC voltage Vac is negative.

Subsequently, the signal processing unit 13 will be described.

The signal processing unit 13 corrects the detected value Is1 which is detected by the circuit current detection unit 12.

As illustrated in FIGS. 3A and 3B, when the switch S2 is off, a current flows through the circuit current detection unit 12, and thus, the circuit current detection unit 12 can measure the circuit current. Meanwhile, when the switch S2 is on, the current does not flow through the circuit current detection unit 12, and thus, the circuit current detection unit 12 cannot detect the circuit current (that is, the detected value Is1 becomes zero).

In the same manner, as illustrated in FIGS. 4A and 4B, when the switch S1 is off, a current flows through the circuit current detection unit 12, and thus, the circuit current detection unit 12 can measure the circuit current. Meanwhile, when the switch S1 is on, the current does not flow through the circuit current detection unit 12, and thus, the circuit current detection unit 12 cannot detect the circuit current (that is, the detected value Is1 becomes zero). Hence, the detected value Is1 has a comb-shaped waveform.

The signal processing unit 13 has a function to supply a value indicating the circuit current flowing when the circuit current detection unit 12 cannot detect the circuit current (i.e. when the detected current value Is1 is zero) by substituting the detected value Is1 detected by the circuit current detection unit 12 before the undetectable period.

For example, the signal processing unit 13 supplies the value during the undetectable period by substituting the detected value Is1 immediately before a change in the detected circuit current, and outputs the value as an intermediate value IsH. In other words, after the detected value Is1 becomes zero, the signal processing unit 13 supplies the detected value Is1 immediately before the detected value Is1 became zero. That is, the signal processing unit 13 sets the detected value in the undetectable period as the detected value Is1 immediately before a change in the detected value, and generates the intermediate value IsH by supplying the detected value from before the change during the undetectable period.

The signal processing unit 13 may also supply the value in the undetectable period by using an average value of the detected value Is1 detected by the circuit current detection unit 12 during the undetectable period. For example, the signal processing unit 13 may sample the detected value Is1 detected by the circuit current detection unit 12 during the undetectable period a predetermined number of times, and supply the value during the undetectable period by using an average of the sampled values. In addition, the signal processing unit 13 may supply the detected value during the undetectable period by performing an approximation (for example, linear approximation, quadratic approximation, or the like) using the detected value Is1 detected during the undetectable period. A method in which the signal processing unit 13 supplies a value during the undetectable period is not limited to a specific method.

In addition, the signal processing unit 13 outputs the correction value IsF by smoothing the intermediate value IsH. For example, the signal processing unit 13 may smooth the intermediate value IsH by using noise removal processing or the like. A method in which the signal processing unit 13 smoothes the intermediate value IsH is not limited to a specific method.

Figure 5:
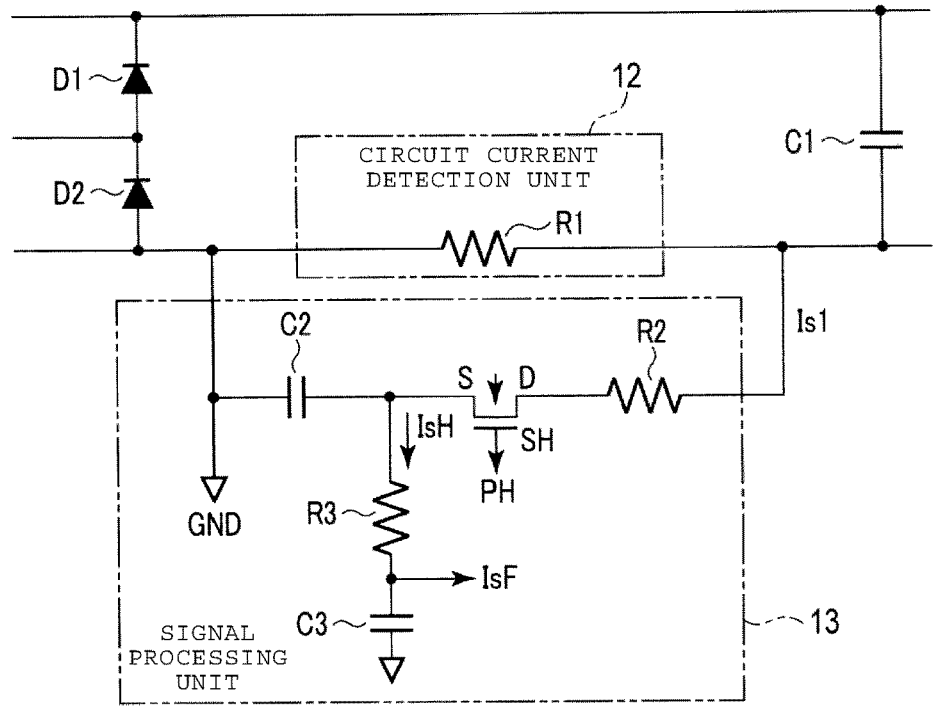
FIG. 5 is a diagram illustrating an example of a current detection unit and a signal processing unit according to the first embodiment.

FIG. 5 is a diagram illustrating an example of the signal processing unit 13.

The signal processing unit 13 illustrated in FIG. 5 detects the circuit current as a positive voltage.

As illustrated in FIG. 5, the signal processing unit 13 includes resistors R2 and R3, a switch SH (hold switch), and capacitors C2 (second capacitor) and C3. In addition, the circuit current detection unit 12 includes a resistor R1 as a current detection resistor.

The resistor R1 of the circuit current detection unit 12 is connected between the capacitor C1 and the anode of the diode D2. Here, the diode D2 side of the circuit current detection unit 12 is maintained at a GND potential. In the example illustrated in FIG. 5, a drain of the switch SH is connected to one end of the resistor R2. A source of the switch SH is connected to one end of the capacitor C2. In addition, the other end of the resistor R2 is connected to one end of the resistor R1 on the capacitor C1 side. The other end of the capacitor C2 is connected to the other end of the resistor R1 and to a GND potential. In addition, one end of the resistor R3 is connected between the source of the switch SH and the capacitor C2. The other end of the resistor R3 is connected to one end of the capacitor C3. The other end of the capacitor C3 is connected to the GND potential.

A gate of the switch SH receives the gate drive signal PH. That is, the switch SH is turned on when the gate drive signal PH is in an H level, and turned off when the gate drive signal PH is in an L level.

As described above, the gate drive signal PH is a signal which is obtained by inverting P1 or P2 that is input to the switch S1 or the switch S2 to control the circuit current. Here, (1) The switch SH is turned on when the AC Voltage Vac is positive and the switch S2 is turned off. In this state, the switch S1 is turned off.
(2) The switch SH is turned off when the AC Voltage Vac is positive and the switch S2 is turned on. In this state, the switch S1 is turned off.
(3) The switch SH is turned on when the AC Voltage Vac is negative and the switch S1 is turned off. In this state, the switch S2 is turned off.
(4) The switch SH is turned off when the AC Voltage Vac is negative and the switch S1 is turned on. In this state, the switch S2 is turned off.

In other words, the switch SH is off when a current does not flow through the circuit current detection unit 12 (a period in which the circuit current does not flow through the circuit current detection unit 12, that is, the undetectable period). Also, the switch SH is turned on when a current flows through the circuit current detection unit 12 (a period in which the circuit current flows through the circuit current detection unit 12, that is, a period in which the circuit current detection unit 12 can detect the circuit current).

The resistor R2, the switch SH, and the capacitor C2 are configured as a hold circuit. When a current does not flow through the circuit current detection unit 12, the hold circuit holds the detected value Is1 immediately before a change in the detected value Is1.

When the switch S1 or the switch S2 is turned off, the switch SH is set to be in an ON state. In this case, the detected value Is1 is detected as a voltage between ends of the capacitor C2.

When the switch S1 or the switch S2 is turned on, the switch SH is turned off, and a capacitor voltage of the capacitor C2 is obtained. That is, the detected value Is1, which is the capacitor voltage, is retained when the switch S1 or the switch S2 is turned on.

Hence, according to the above operation, the hold circuit can hold the detected value Is1 immediately before a change, when the circuit current detection unit 12 cannot detect the circuit current. Thus, the hold circuit can generate the intermediate value IsH.

The resistor R3 and the capacitor C3 form a circuit which performs noise removal processing of the intermediate value IsH. The resistor R3 and the capacitor C3 may be a CR filter, or the like, which is configured by an inexpensive resistor and capacitor. The resistor R3 and the capacitor C3 function as a low pass filter for the intermediate value IsH. The resistor R3 and the capacitor C3 smooth the intermediate value IsH and generate the correction value IsF.

Subsequently, the signal processing unit 13 which detects the circuit current as a negative voltage will be described.

Figure 6:
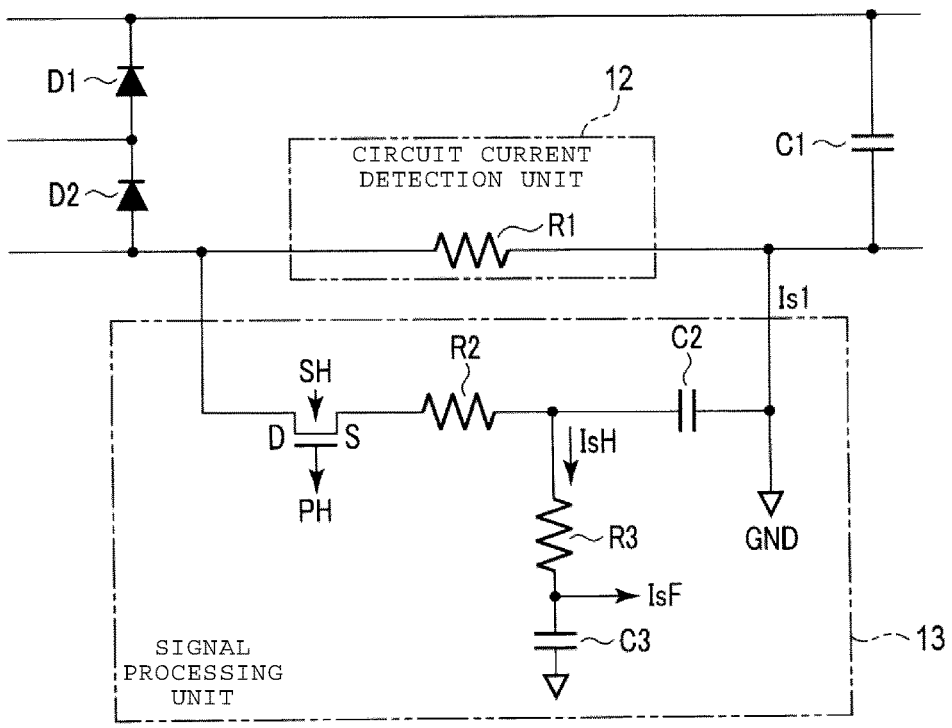
FIG. 6 is a diagram illustrating another example of the current detection unit and the signal processing unit according to the first embodiment.

FIG. 6 is a diagram illustrating another example of the signal processing unit 13 which detects the circuit current as a negative voltage.

As illustrated in FIG. 6, the signal processing unit 13 includes the resistors R2 and R3, the switch SH (hold switch), and the capacitors C2 (second capacitor) and C3. In addition, the circuit current detection unit 12 includes the resistor R1 as a current detection resistor.

The resistor R1 of the circuit current detection unit 12 is connected between the capacitor C1 and the anode of the diode D2. Here, the capacitor C1 side of the circuit current detection unit 12 is maintained at a GND potential. In the example illustrated in FIG. 6, the drain of the switch SH is connected to one end of the resistor R1 on the diode D2 side. The source of the switch SH is connected to one end of the resistor R2. In addition, the other end of the resistor R2 is connected to one end of the capacitor C2. The other end of the capacitor C2 is connected to the other end of the resistor R1 and to the GND potential. In addition, one end of the resistor R3 is connected between the other end of the resistor R2 and one end of the capacitor C2. The other end of the resistor R3 is connected to one end of the capacitor C3. The other end of the capacitor C3 is connected to the GND potential.

In the example illustrated in FIG. 6, the GND potential is provided on the capacitor C1 side, and thus, when the circuit current flows through the resistor R1, a voltage at a terminal on the diode D2 decreases to a voltage lower than the GND potential. Hence, the signal processing unit 13 illustrated in FIG. 6 can detect the circuit current as a negative voltage.

In the signal processing unit 13 illustrated in FIG. 5 and FIG. 6, one end of the capacitor C2 is connected to the GND potential. For this reason, electric charges of the capacitor C2 flow into the GND. However, when a voltage of the detected value Is1 is lower than a forward voltage of a body diode of the switch SH, a hold state can be maintained. For example, when the forward voltage of the body diode of the switch SH is equal to or higher than 1 V, the resistor R1 is set such that the detected value Is1 is less than 1 V.

Subsequently, a voltage which is generated in each unit of the power conversion circuit 10 will be described.

Figure 7:
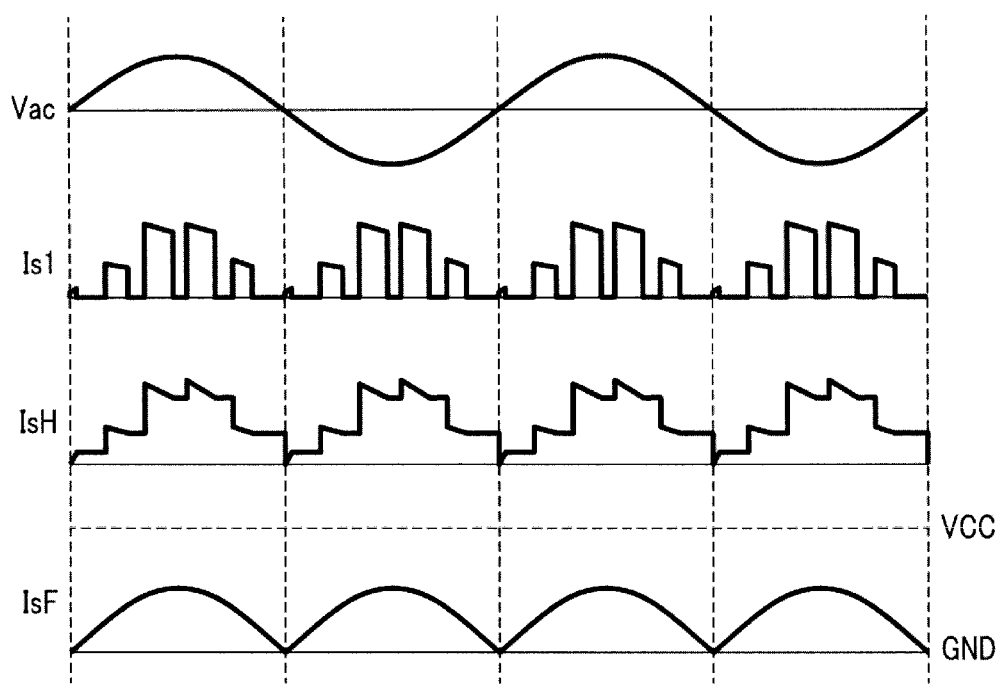
FIG. 7 illustrates examples of a voltage and currents which are generated in each unit of the power conversion device according to the first embodiment.
Figure 8:
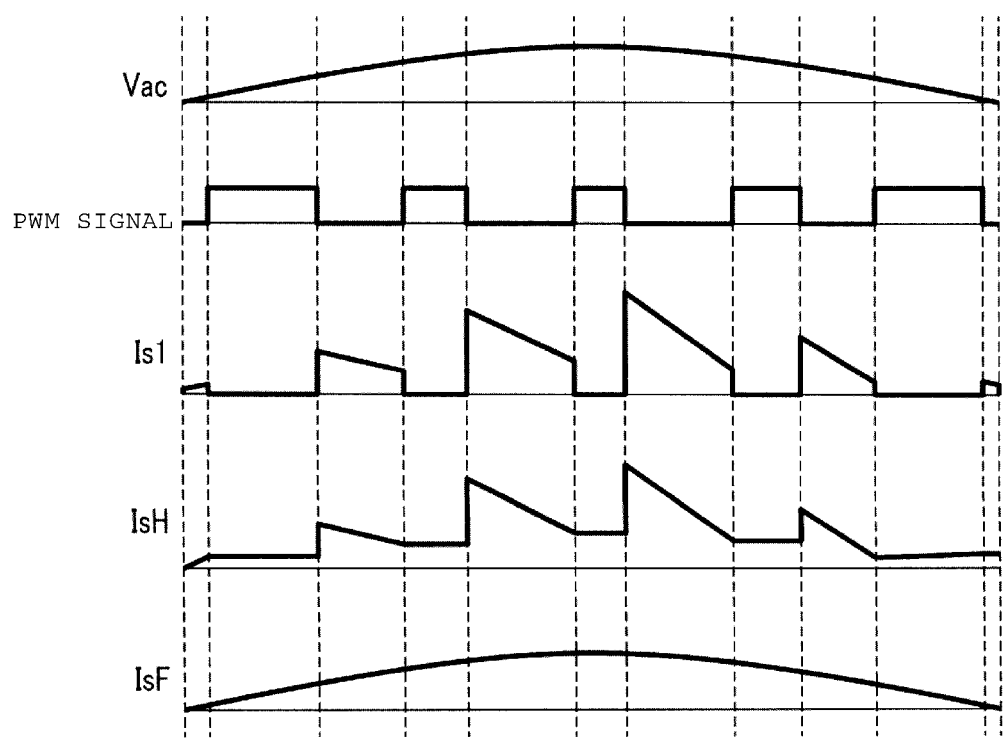
FIG. 8 illustrates other examples of the voltage and the currents which are generated in each unit of the power conversion device according to the first embodiment.

FIG. 7 is a diagram illustrating an example of the AC voltage Vac, the detected value Is1, the intermediate value IsH, and the correction value IsF. In addition, FIG. 8 is a diagram illustrating an example of the AC voltage Vac corresponding to a half cycle of the AC voltage Vac, the PWM signal (P1 or P2), the detected value Is1, the intermediate value IsH, the correction value IsF.

As illustrated in FIG. 7, the AC voltage Vac is an alternating voltage which repeats positive and negative values.

The detected value Is1 is a voltage which is generated by the circuit current detection unit 12. When the switch S1 or the switch S2 is turned off, a voltage is generated in the circuit current detection unit 12, and the detected value Is1 is provided. In addition, when the switch S1 or the switch S2 is turned on, a voltage is not generated in the circuit current detection unit 12, and the detected value Is1 becomes zero since no current is detected.

The intermediate value IsH is a voltage which is generated in the capacitor C2. When the switch S1 or the switch S2 is turned on, the switch SH is turned off. For this reason, a capacitor voltage of the capacitor C2 is maintained as a value immediately before the change to the switch S1 or the switch S2. Also for this reason, the intermediate value IsH has a waveform, while the detected value Is1 is zero, which is set by the detected value Is1 immediately before the change in state of the switch S1 or the switch S2. The correction value IsF has a waveform which is obtained by smoothing the intermediate value IsH.

The PWM generation unit 31 (FIG. 2) may also generate a PWM signal by using a sawtooth wave. A method in which the PWM generation unit 31 generates the PWM signal is not limited to a specific method.

In addition, in the present embodiment, a case where the voltage of the AC power supply which is an input is regarded as a sinusoidal wave and the input is controlled to have a current waveform different from the sinusoidal wave, is described. However, the embodiment is not limited to the described method. For example, a sinusoidal wave generation unit may be provided in a control block, and a structure in which the sinusoidal wave coincides with a phase of the AC power supply may be provided.

The power conversion device according to the first embodiment having the aforementioned configuration can measure the circuit current as a positive voltage (or negative voltage).

When control by the control unit is performed using a microcontroller, the voltage value input to the control unit is only within a range of 0 V to $V_{CC}$ (approximately 5 V) which are application voltages of the microcontroller. Meanwhile, when an AC current is detected by using an insulation current transformer in the same manner as in the related art, positive and negative alternating voltages above and below a zero voltage can be detected. Because they alternate between positive and negative values, these voltages cannot be used as an input of the microcontroller as-is. For example, when an AC voltage alternates between values of ±2.5 V, processing is needed in which an offset voltage of 2.5 V is added to a detected value of the voltage and the voltage values are changed to a range above and below 2.5 V. By using the present embodiment, such a change can be implemented so a detected value is obtained that is normally positive and can be supplied as a signal input of the microcontroller as-is.

As described above, the power conversion device according to the first embodiment can measure the circuit current without using expensive components such as CT components for measuring an AC current. That is, a circuit which detects a circuit current for controlling each switch can be configured by inexpensive components. For this reason, the power conversion device can be manufactured with a low cost. In addition, a circuit which detects a circuit current for controlling each switch can be configured by low-power components. For this reason, it is possible to achieve miniaturization and weight reduction of the power conversion device.

(Second Embodiment)

Next, a power conversion device 101 according to a second embodiment will be described.

The power conversion device 101 according to the second embodiment is different from the power conversion device 1 according to the first embodiment in that a switch S3 (third switch) and a switch S4 (fourth switch) are used instead of the diode D1 and the diode D2. Hence, the same symbols or reference numerals are given to the other components and detailed description thereof will be omitted for brevity.

Figure 9:
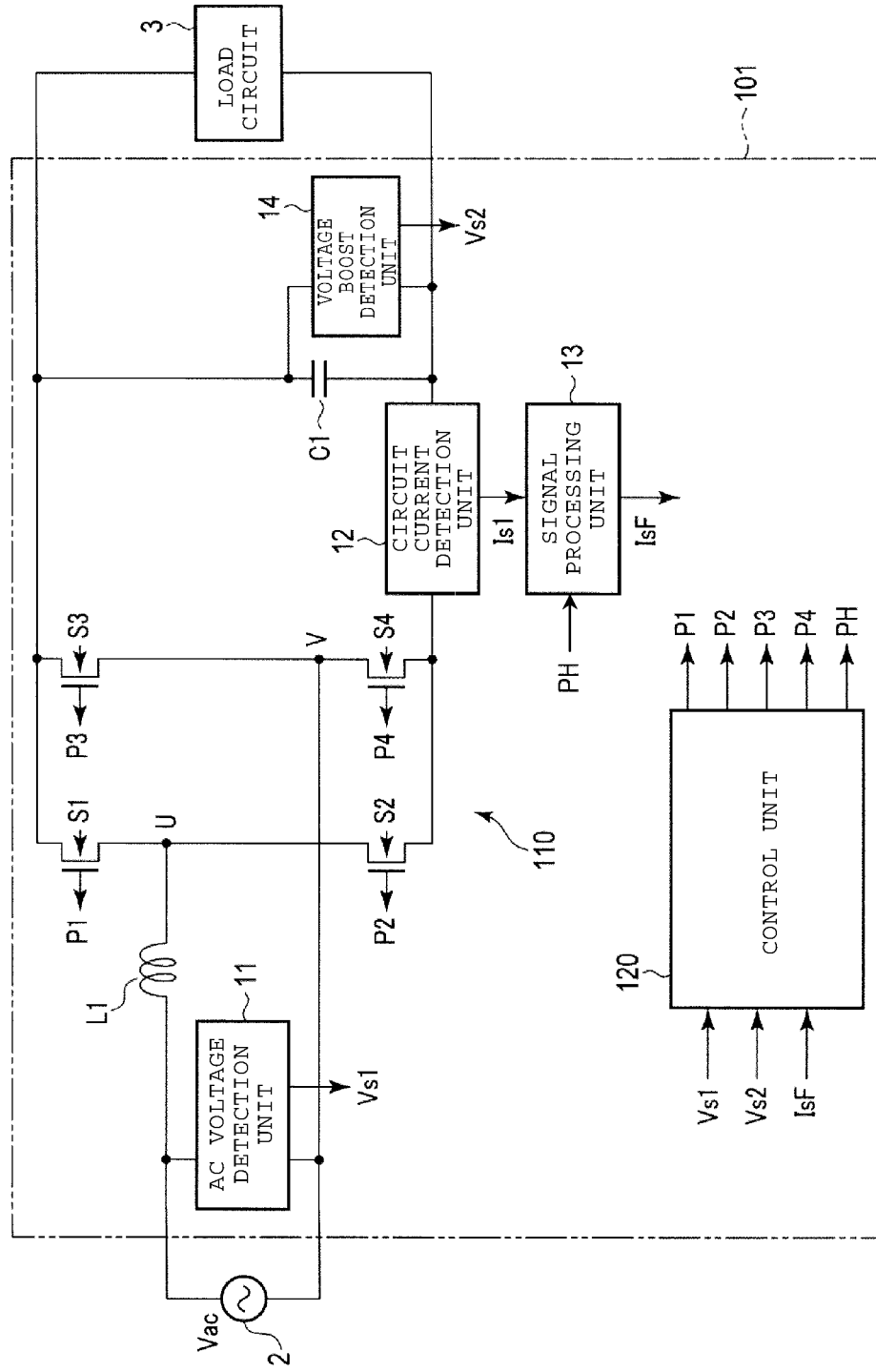
FIG. 9 is a diagram illustrating an example of a power conversion device according to a second embodiment.

FIG. 9 is a diagram illustrating an example of the power conversion device 101.

As illustrated in FIG. 9, the power conversion device 101 includes a power conversion circuit 110 and a control unit 120. The power conversion circuit 110 includes switches S1 to S4, the capacitor C1, the inductor L1, the AC voltage detection unit 11, the circuit current detection unit 12, the signal processing unit 13, and the voltage detection unit 14.

In the power conversion circuit 110, the switch S1 is connected in series to the switch S2, and the switch S3 is connected in series to the switch S4. A serial-connection of the switches S1 and S2 is connected in parallel with a serial-connection of the switches S3 and S4, thereby forming a closed loop.

The switches S3 and S4 have the same configurations as the switches S1 and S2. The switches S3 and S4, respectively, receive gate control signals P3 and P4 from the control unit 120.

A drain of the switch S1 is connected to a drain of the switch S3. A source of the switch S1 is connected to a drain of the switch S2. In addition, a source of the switch S3 is connected to a drain of the switch S4. In addition, a source of the switch S2 is connected to a source of the switch S4. According to these connections, the switches S1 to S4 form a closed loop and provide a bridge circuit.

Here, as illustrated in FIG. 9, a connection point between the source of the switch S1 and the drain of the switch S2 is referred to as a U point and a connection point between the source of the switch S3 and the drain of the switch S4 is referred to as a V point. The AC power supply 2 and the inductor L1 are connected in series between the U point and the V point. The connections between the respective units are not limited to a specific sequence.

The capacitor C1 is connected in parallel with the serial-connection of the switches S1 and S2 and the serial-connection of the switch S3 and the switch S4. The capacitor C1 and the switches S1 to S4 form an H bridge.

The control unit 120 receives the detected value Vs1 of the AC voltage detection unit 11, the correction value IsF of the signal processing unit 13, and the detected value Vs2 of the voltage detection unit 14. The control unit 120 outputs gate drive signals P1, P2, P3, P4, and PH to the switch S1, the switch S2, the switch S3, the switch S4, and the signal processing unit 13, respectively. The control unit 120 controls the switch S1 to the switch S4.

Figure 10:
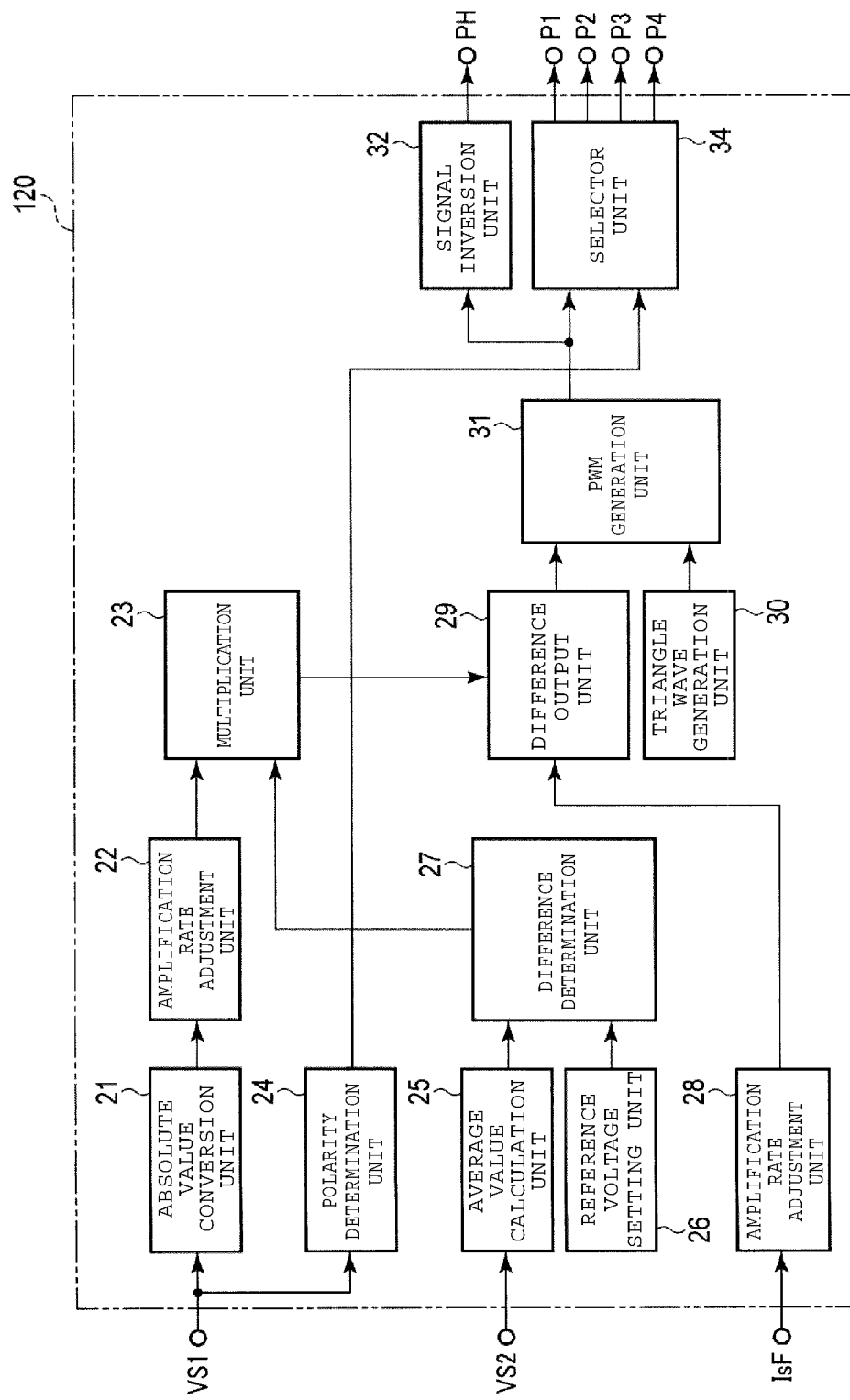
FIG. 10 is a block diagram illustrating an example of a control unit of the power conversion device according to the second embodiment.

FIG. 10 illustrates an example of the control unit 120.

As illustrated in FIG. 10, the control unit 120 includes an absolute value conversion unit 21, an amplification rate adjustment unit 22, a multiplication unit 23, a polarity determination unit 24, an average value calculation unit 25, a reference voltage setting unit 26, a difference determination unit 27, an amplification rate adjustment unit 28, a difference output unit 29, a triangle wave generation unit 30, a PWM generation unit 31, a signal inversion unit 32, and a selector unit 34. The respective units may be achieved by hardware, or software. For example, apart or all of the respective units may be achieved by a DSP.

The absolute value conversion unit 21, the amplification rate adjustment unit 22, the multiplication unit 23, the polarity determination unit 24, the average value calculation unit 25, the reference voltage setting unit 26, the difference determination unit 27, the amplification rate adjustment unit 28, the difference output unit 29, the triangle wave generation unit 30, the PWM generation unit 31, and the signal inversion unit 32 are the same as those described in connection with the first embodiment, and thus, description thereof will be omitted for brevity.

The selector unit 34 selects an output destination of the PWM signal according to the output value of the polarity determination unit 24. For example, when the output value of the polarity determination unit 24 is "1", the selector unit 34 outputs an output of the PWM generation unit 31 as P2. In addition, when the output value of the polarity determination unit 24 is "0", the selector unit 34 outputs the output of the PWM generation unit 31 as P1.

When the AC voltage Vac is positive, the selector unit 34 repeatedly outputs the gate drive signal P2 to the switch S2, but the gate drive signal P3 of the switch S3 is retained in an H level constantly, in a configuration in which the AC voltage Vac is positive.

When the AC voltage Vac is negative, the selector unit 34 repeatedly outputs the gate drive signal P1 to the switch S1, but the gate drive signal P4 of the switch S4 is retained in an H level constantly, in a configuration in which the AC voltage Vac is negative.

When the AC voltage Vac is positive, the gate drive signal P2 is repeatedly applied to the switch S2, and as the result, a current flows through a body diode of the switch S3. When the AC voltage Vac is negative, the gate drive signal P1 is repeatedly applied to the switch S1, and as the result, a current flows through a body diode of the switch S4.

Hence, the switches S3 and S4 can be used as diodes in the same manner as in the first embodiment, without gate driving. However, since the body diodes have high forward voltages, power loss occurs in which loss=voltage×current.

Subsequently, when the AC voltage Vac is positive, a current flows through the body diode of the switch S3, but at this time, the gate drive signal P3 is applied to the switch S3. Then, the switch S3 is continuously on, but loss in this state is given by loss=square of current×ON resistance.

In general, it is not possible to decrease a forward voltage of a diode, but ON resistance can be decreased by changing selection of an element. That is, power loss can be reduced by applying an ON pulse to the gate, even in the same conduction.

In the same manner, even when the AC voltage Vac is negative, the gate drive signal P4 is applied to the switch S4 in a section in which a current flows through the body diode of the switch S4. Then, loss of the switch S4 is further reduced when the gate drive signal P4 is applied, as compared to a case when the gate drive signal P4 is not applied.

As described above, the power conversion device according to the second embodiment can measure the circuit current without using expensive components such as CT components so as to measure the AC current. That is, a circuit which detects the circuit current for controlling each switch can be configured by inexpensive components. For this reason, the power conversion device can be manufactured with a low cost. In addition, a circuit which detects the circuit current for controlling each switch can be configured by small-power components. For this reason, it is possible to achieve miniaturization and weight reduction of the power conversion device. In addition, according to the second embodiment, it is possible to prevent power loss caused by a forward voltage of a diode from occurring, and furthermore, to perform an efficient power conversion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion device comprising:
   a power conversion circuit including a first switch and a second switch connected in series, a first diode and a second diode connected in series, the first and second diodes being connected in parallel with the first and second switches, a cathode of the first diode being connected to an end of the first switch and an anode of the second diode being connected to an end of the second switch, an AC power supply connected between a first connection point that is between the first switch and the second switch and a second connection point that is between the first diode and the second diode, a first inductor that is between the AC power supply and the first connection point, a capacitor that is connected in parallel with the first and second diodes, a potential difference across the capacitor being an output voltage to a load circuit; and
   a control unit is configured to supply a pulse signal to the first switch and the second switch according to polarity of the AC power supply so that a sinusoidal wave current synchronous with a voltage phase of the AC power supply flows through the AC power supply, the pulse signal being based on a detected value of a power supply voltage that is obtained by a first voltage detection unit connected to the AC power supply and configured to detect a voltage of the AC power supply, a detected value of a circuit current that is obtained by a circuit current detecting unit connected between the end of the second switch and an end of the capacitor and configured to detect a current carrying electric charges to the capacitor, and a capacitor voltage detected value that is obtained by a second voltage detecting unit connected in parallel to the capacitor and configured to detect a smoothing voltage of the capacitor.

2. The device according to claim 1,
   wherein the power conversion circuit includes the circuit current detection unit and a signal processing unit connected in parallel with the circuit current detection unit and configured to hold an output value from the circuit current detection unit and supply a signal corresponding to the output value from the circuit current to the control unit according to a hold signal supplied from the control unit.

3. The device according to claim 2,
wherein the circuit current detection unit includes a current detection resistor connected between the end of the second switch and the end of the capacitor, and the detected value of the circuit current is supplied from a node between the current detection resistor and the end of the capacitor.

4. The device according to claim 3,
wherein the current detection resistor is at a GND potential on an end connected to the end of the capacitor, and the control unit is configured to generate a negative voltage signal in the current detection resistor when current flows through the capacitor.

5. The device according to claim 3,
wherein the current detection resistor is at a GND potential on an end connected to the end of the second switch, and the control unit is configured to generate a positive voltage signal in the current detection resistor when current flows through the capacitor.

6. The device according to claim 3,
wherein the control unit is configured to generate the hold signal based on an inverted signal of a drive signal of the first switch or the second switch, and use an output of the signal processing unit as a comparison signal to generate a PWM signal for the first switch or the second switch.

7. he device according to claim 1,
wherein the circuit current detection unit includes a current detection resistor connected between the end of the second switch and the end of the capacitor, and the detected value of the circuit current is supplied from a node between the current detection resistor and the end of the capacitor.

8. The device according to claim 1,
wherein the circuit current detection unit includes a current detection resistor that is at a GND potential on an end connected to the end of the second switch, and the control unit is configured to generate a positive voltage signal in the current detection resistor when current flows through the capacitor.

9. The device according to claim 1,
wherein the circuit current detection unit includes a current detection resistor that is at a GND potential on an end connected to the end of the capacitor, and the control unit is configured to generate a negative voltage signal in the current detection resistor when current flows through the capacitor.

10. A power conversion device comprising:
a power conversion circuit including a first switch and a second switch connected in series, a third switch and a fourth switch connected in series, the first and second switches being connected in parallel with the third and fourth switches such that an end of the first switch is connected to an end of the third switch and an end of the second switch is connected to an end of the fourth switch, an AC power supply connected to a first connection point between the first switch and the second switch and a second connection point that is between the third switch and the fourth switch, a first inductor that is between the AC power supply and the first connection point, a capacitor that is connected in parallel with the third and fourth switches, and a potential difference across the capacitor being an output voltage to a load circuit; and
a control unit configured to supply a first pulse signal to the first switch and the second switch according to a polarity of the AC power supply, and a second pulse signal that turns on one of the third switch and the fourth switch according to the polarity of the AC power supply, so that a sinusoidal wave current synchronous with a voltage phase of the AC power supply flows through the AC power supply, the first and second pulse signals being based on a detected value of a power supply voltage that is obtained by a first voltage detection unit connected to the AC power supply and configured to detect a voltage of the AC power supply, a detected value of a circuit current that is obtained by a circuit current detection unit connected between the end of the second switch and an end of the capacitor and configured to detect a current carrying electric charges to the capacitor, and a capacitor voltage detected value that is obtained by a second voltage detecting unit connected in parallel to the capacitor and configured to detect a voltage across the capacitor.

11. The device according to claim 10,
wherein the power conversion circuit includes the circuit current detection unit.

12. The device according to claim 11,
wherein the power conversion circuit includes a hold mechanism that holds an output value of the circuit current detection unit.

13. The device according to claim 12,
wherein the control unit is configured to generate a hold signal based on an inverted signal of a drive signal of the first switch or the second switch, and use an output of the hold mechanism as a comparison signal to generate a PWM signal for the first switch or the second switch.

14. The device according to claim 11,
wherein the circuit current detection unit includes a current detection resistor connected between the end of the second switch and the end of the capacitor, and the detected value of the circuit current is supplied from a node between the current detection resistor and the end of the second switch, and
the current detection resistor is at a GND potential on an end connected to the end of the capacitor.

15. The device according to claim 10
wherein the circuit current detection unit includes a current detection resistor connected in series with the fourth switch and the capacitor, and
the current detection resistor is at a GND potential on an end connected to the second switch.

16. A power conversion device comprising:
a power conversion circuit comprising:
    a first AC power supply node and a second AC power supply node;
    a first switch having a first end connected to a first end of a second switch, the first and second switches being connected in series,
    a first diode having a first end connected to a first end of a second diode, the first and second diodes being connected in series, the first switch having a second end connected to a second end of the first diode, and the second switch having a second end connected to a second end of the second diode,
    a first inductor connected between the first AC power supply node and a first connection point between the first end of the first switch and the first end of the second switch, the second AC power supply node being connected to a second connection point between the first end of the first diode and the first end of the second diode, a capacitor connected to in parallel to the first and second diodes, the capacitor being connected to the second ends of the first diode and the second diode, a control unit configured to supply a pulse signal to the first switch and the second switch, based on a detected power supply voltage value between the first and second AC power supply nodes, a detected circuit current value for a current flowing from the second ends of the second switch and second diode to the capacitor, and a detected capacitor voltage value across the capacitor, and a circuit current detection unit between the second end of the second switch and the capacitor and configured to supply the detected circuit current value.

17. The device according to claim 16,
wherein the circuit current detection unit includes a current detection resistor that is connected to a GND potential on an end connected to the second end of the second switch.

18. The device according to claim 16,
wherein circuit current detection unit includes a current detection resistor that is connected to a GND potential on an end connected to the capacitor.

19. The device according to claim 16,
wherein the power conversion circuit includes a hold mechanism that holds an output value of the current detection unit.

20. The device according to claim 19,
wherein the control unit is configured to generate a hold signal based on an inverted signal of a drive signal of the first switch or the second switch, and use an output of the hold mechanism as a comparison signal to generate a PWM signal for the first switch or the second switch.

* * * * *